United States Patent
Bandhole et al.

(10) Patent No.: US 7,213,231 B1
(45) Date of Patent: May 1, 2007

(54) CROSS-SPECTRUM APPLICATION MODEL FOR DYNAMIC COMPUTING ENVIRONMENTS IN SOFTWARE LIFECYCLE

(75) Inventors: Jagadish Bandhole, San Jose, CA (US); Sekaran Nanja, San Jose, CA (US); Shan Balasubramaniam, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 569 days.

(21) Appl. No.: 10/044,290

(22) Filed: Jan. 11, 2002

Related U.S. Application Data

(60) Provisional application No. 60/261,683, filed on Jan. 11, 2001.

(51) Int. Cl.
*G06F 9/44* (2006.01)
(52) U.S. Cl. .................................. 717/121; 717/101
(58) Field of Classification Search ........ 717/168–178, 717/121, 101–105
See application file for complete search history.

(56) References Cited

U.S. PATENT DOCUMENTS

| | | | | |
|---|---|---|---|---|
| 4,925,311 | A | 5/1990 | Neches et al. ............... | 364/200 |
| 5,394,522 | A | 2/1995 | Sanchez-Frank et al. ... | 395/159 |
| 5,418,941 | A * | 5/1995 | Peters ......................... | 714/38 |
| 5,479,599 | A * | 12/1995 | Rockwell et al. ........... | 715/837 |
| 5,515,524 | A | 5/1996 | Lynch et al. ................ | 395/500 |
| 5,555,370 | A | 9/1996 | Li et al. ..................... | 395/161 |
| 5,668,995 | A | 9/1997 | Bhat .......................... | 395/674 |
| 5,784,702 | A * | 7/1998 | Greenstein et al. ......... | 711/173 |
| 5,794,062 | A * | 8/1998 | Baxter ........................ | 712/30 |
| 5,894,571 | A | 4/1999 | O'Connor ................... | 395/652 |
| 5,896,530 | A * | 4/1999 | White ......................... | 718/102 |
| 5,913,061 | A * | 6/1999 | Gupta et al. ................ | 719/310 |
| 6,009,507 | A | 12/1999 | Brooks et al. ............... | 712/28 |
| 6,081,864 | A | 6/2000 | Lowe et al. ................. | 710/129 |
| 6,182,123 | B1 | 1/2001 | Filepp et al. ............... | 709/217 |
| 6,182,275 | B1 | 1/2001 | Beelitz et al. ................ | 717/1 |
| 6,230,200 | B1 | 5/2001 | Forecast et al. ............ | 709/226 |
| 6,259,448 | B1 * | 7/2001 | McNally et al. ............ | 715/733 |
| 6,366,945 | B1 * | 4/2002 | Fong et al. ................. | 718/104 |

(Continued)

FOREIGN PATENT DOCUMENTS

EP 745929 A1 4/1996

(Continued)

OTHER PUBLICATIONS

Debenham, Clive, "Taos: The Operating System," May 29, 1995, Tantric Technologies, Newsgroups: comp.parallel.

(Continued)

*Primary Examiner*—Tuan Dam
*Assistant Examiner*—Andre R. Fowlkes
(74) *Attorney, Agent, or Firm*—Campbell Stephenson Ascolese LLP

(57) ABSTRACT

Dynamic Computing Environments (DCEs) are used throughout phases of a software lifecycle. The DCE is configured through a remote user for a phase in the lifecycle. The DCE is then configured according to the command. The user then uses the DCE to fulfill the requirements of the phase. When the phase is completed, a command from the remote user is sent to configure the DCE for another phase. Once the DCE is re-configured, the user uses the DCE to fulfill the requirements of the phase.

21 Claims, 7 Drawing Sheets

U.S. PATENT DOCUMENTS

| | | | |
|---|---|---|---|
| 6,370,560 B1 | 4/2002 | Robertazzi et al. | 709/105 |
| 6,374,336 B1 | 4/2002 | Peters et al. | 711/167 |
| 6,393,557 B1 | 5/2002 | Guthridge et al. | 713/1 |
| 6,466,978 B1 | 10/2002 | Mukherjee et al. | 709/225 |
| 6,493,679 B1 | 12/2002 | Rappaport et al. | 705/29 |
| 6,505,229 B1 * | 1/2003 | Turner et al. | 718/107 |
| 6,543,047 B1 | 4/2003 | Vrhel, Jr. et al. | 717/121 |
| 6,560,606 B1 | 5/2003 | Young | 707/100 |
| 6,564,112 B1 | 5/2003 | Factor | 700/97 |
| 6,578,141 B2 | 6/2003 | Kelley et al. | 713/1 |
| 6,633,916 B2 | 10/2003 | Kauffman | 709/229 |
| 6,658,564 B1 * | 12/2003 | Smith et al. | 713/100 |
| 6,802,062 B1 * | 10/2004 | Oyamada et al. | 718/1 |

FOREIGN PATENT DOCUMENTS

EP     841616 A2     5/1998

OTHER PUBLICATIONS

Application Developer's Training Course, SNAP 8.0 Training Participant Guide, Module 7, Copyright © 1997, Template Software, Inc., pp. 7-1 through 7-34.

Workflow Template, Developing A WFT Workflow System, Copyright © 1998, Template Software, Inc.

Workflow Template, Using the WFT Development Environment, Copyright © 1998, Template Software, Inc.

Web Component, Using the Web Component, Copyright © 1997, Template Software, Inc.

* cited by examiner

CROSS-SPECTRUM APPLICATION MODEL FOR DYNAMIC COMPUTING ENVIRONMENTS IN SOFTWARE LIFECYCLE

CROSS-REFERENCES TO RELATED APPLICATIONS

The present application claims the benefit of priority under 35 U.S.C. § 119 from the provisional patent application, U.S. Provisional Patent Application No. 60/261,683, filed on Jan. 11, 2001, which is hereby incorporated by reference as if set forth in full in this document.

This application is related to U.S. Non-Provisional Patent Application entitled "User Interface for Dynamic Computing Environment Using Allocateable Resources" Serial No. 09/663,252 filed on Sep. 15, 2000, page no. 1–27, FIGS. 1–5, U.S. Non-Provisional Patent Application entitled "System for Configuration of Dynamic Computing Environments Using a Visual Interface" Ser. No. 09/662,990 filed on Sep. 15, 2000, page no. 1–23, FIGS. 1–2, and U.S. Non-Provisional patent application Ser. No. 09/861,483 filed on May 17, 2001 entitled "Dynamic Computing Environment Using Remotely Allocable Resources", which are hereby incorporated by reference, as if set forth in full in this document, for all purposes.

BACKGROUND OF THE INVENTION

The present invention relates in general to digital processing and more specifically to an application model for the use of dynamic computing environments in various phases of software lifecycle.

In the past, software providers shrink-wrapped software in digital media, such as floppy disks or CD-ROMs, for distribution to customers. Thus, distribution involved one copy of the software per customer.

With the arrival of the Internet, distribution by downloading was made possible, but software was still packaged as an entity that has to reach each individual customer. Thus, a new mode of software—the 'Web site'— was made available. The Web site is a limited abstraction of a client-server software model where the clients were now universal web clients, i.e., browsers, and the servers had limited and focused functionality, i.e., searching, messaging, transacting, etc. In this model, browsers did not depend on the specific software running on any web site or the specific service provided by any web site. Thus, the new distribution model for software was the exact reverse of the older model—all customers (virtually) travel to the web site to use the software instead of the software going to the customer(s). Therefore, a single copy of the server software was used for many customers (without distribution) and client software was available/applicable universally. This reversal entailed a fundamental shift in the underlying model of computation in that most data (search catalogs, emails, product catalogs) were generated and/or stored at the provider end and almost all of the computation happened at the provider end. This was different from the traditional model where all the data were generated and stored on the customer end and all the computation happened on the customer end. Even in the traditional client-server setting, both the client and the server were typically located in the customer end.

The maturity of Internet/Web software and the increased availability of cheaper communication bandwidth have resulted in another model of software distribution: the Application Service Provider (ASP) model, also known as the 'Software as Service' model. The model fills a continuum between the two models described above: software can be located completely at the provider end or can be modularized so that some parts are located at the provider end and the rest at the customer end. In this model, data may be generated at the customer end, the provider end, or both. Additionally, computation may happen at either end or can be distributed in parts. Thus, either a single copy of the software may be used for many customers or each customer may receive a copy of some parts of the software. Also, computation may even be mobile, i.e., computation may be switched dynamically—back and forth—between the provider and customer ends. This implies on-the-fly distribution of copies of parts of the software to individual customers.

The typical lifecycle of software includes the following phases: development, integration, testing, beta testing, beta deployment, staging, and deployment. Additionally, this list does not include phases like Requirements Analysis or Design that typically do not involve computing resources. Also, all these phases may not apply to all three of the software models discussed above and even when they do apply, they may be highly dissimilar in nature. For instance, staging is not a typical phase for shrink-wrapped software. As another example, deployment of shrink-wrapped software involves deployment in various customer environments while deployment of web-site software involves hosting in the provider environment, and further deployment of ASP software may involve a combination of both of these and infrastructure for enabling distributed/mobile computation.

A given software model will entail a spectrum of computing needs and constraints to cover the various phases of the lifecycle. For instance, the development phase of the lifecycle may need many copies of one type of configuration; while the testing phase may need one copy of many types of configurations. In order to meet the different needs of each phase of the lifecycle, a provider must manually set up the computing requirements for each phase. For example, in the development phase, many copies of the one type of configuration must be loaded onto a number of computers for development to be done. Once the development stage has been completed, the testing phase may require many types of configurations. The different configurations either need to be manually loaded onto the same computers used in the development stage or other computers with the desired configurations must be found and set up.

The different requirements of each phase of the software lifecycle presents problems in relation to manpower, computing power, and flexibility. For example, administrators are needed to address the changing computing needs of each phase. Additionally, administrators physically set up the computers required for each phase. With regard to computing power, certain phases may require more powerful machines than other phases, which may cause cost and space restrictions on a provider. For example, the testing phase may require the use of many workstations and the development phase may require the use of a personal computer. Because of the high cost of workstations, a provider may not be able to purchase an adequate number of workstations or may not be able to justify purchasing a large number of workstations for only one phase of the software lifecycle. Further, a provider is limited to using the actual machines that are present at the site of the stage of the lifecycle. Thus, new machines cannot be used during a stage without physically importing them into the site.

The computing requirements of each phase may be different from other phases. Thus, moving from one phase to another results in reconfiguration of computing environments. The physical reconfiguration results in waste of manpower (i.e., systems administrators) and delays in the lifecycle itself.

BRIEF SUMMARY OF THE INVENTION

An application model for using Dynamic Computing Environments (DCEs) in a software lifecycle is provided by virtue of the present invention.

In one embodiment, DCEs are used throughout phases of a software lifecycle. The DCE is configured through a remote user for a phase in the lifecycle. The DCE is then configured according to the command. The user then uses the DCE to fulfill the requirements of the phase. When the phase is completed, a command from the remote user is sent to configure the DCE for another phase. Once the DCE is re-configured, the user uses the DCE to fulfill the requirements of the phase.

All the computing resources that are used during the phases are located in the DCE. The user's computing resources are only used to communicate with the DCE. Thus, phases in the software lifecycle may be completed remotely using the DCE.

In one embodiment, a method of using a dynamic computing environment ("DCE") for a plurality of phases in a software lifecycle, wherein each phase in the plurality of phases in the software lifecycle include computing resource requirements. The method comprises: (a) sending a command to the DCE to allocate computing resource requirements for a phase in the plurality of phases; (b) configuring the DCE with the computing resource requirements for the phase; (c) performing the phase using the configured DCE; and (d) repeating steps (a)–(c) for the plurality of phases in the software lifecycle.

A further understanding of the nature and advantages of the invention herein may be realized by reference of the remaining portions in the specifications and the attached drawings.

DETAILED DESCRIPTION OF THE INVENTION

Figure 1:
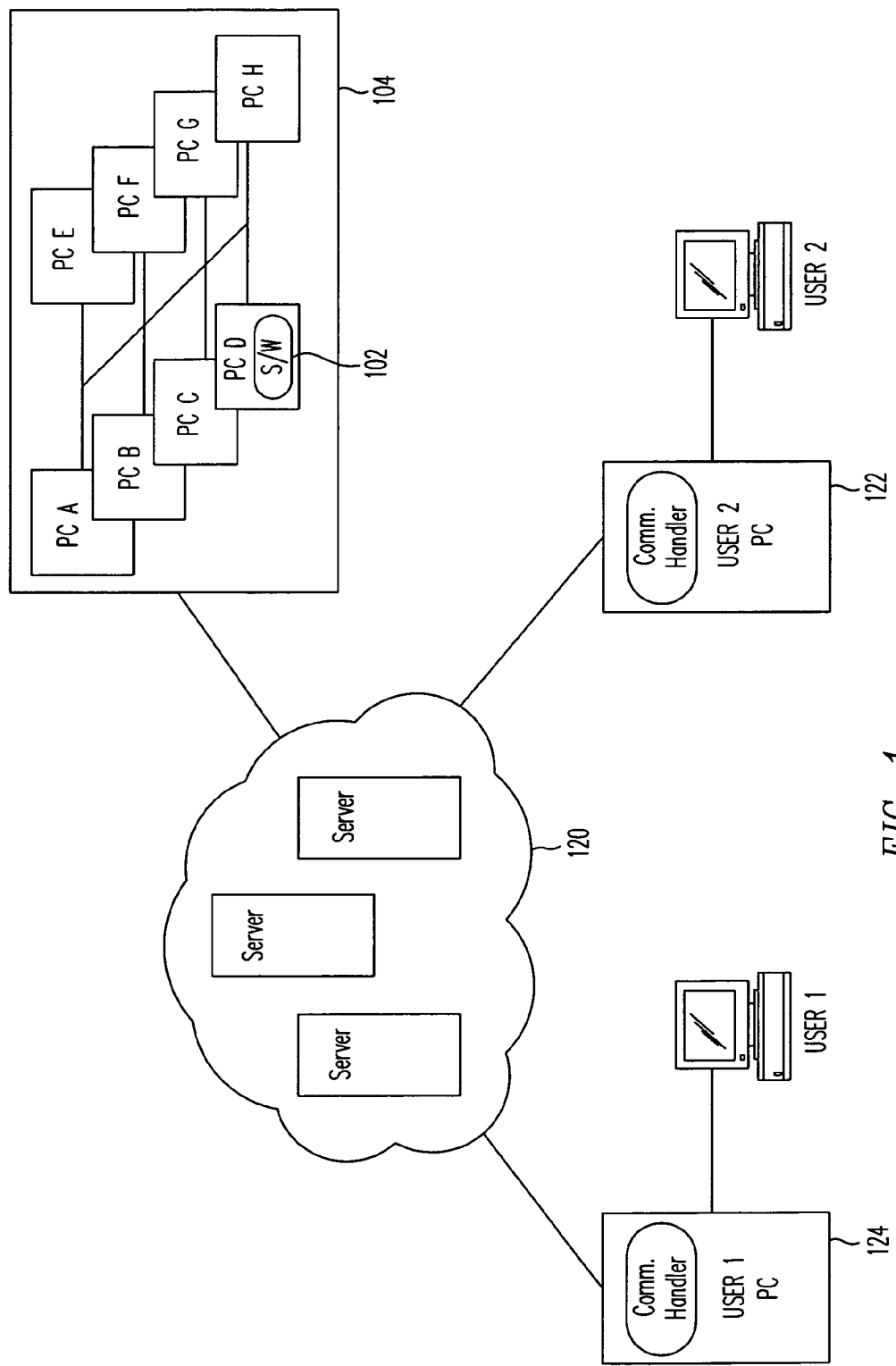
FIG. 1 illustrates a USER1 PC, USER2 PC, and a dynamic computing environment ("DCE") according to one embodiment.

One embodiment of the present invention allows fast, efficient selection and configuration of processing networks, which can then be accessed and managed remotely. The processing network is referred to as a system including "resources." A system resource is any hardware, software, or communication components in the system. For example, discrete hardware devices include processing platforms, such as computers or processors, mobile/laptop computers, embedded computing devices, hand-held computers, personal digital assistants, point-of-sale terminals, smart-card devices, storage devices, data transmission and routing hardware etc., without limitation. Additionally, computer peripherals such as monitors, input/output devices, disk drives, manufacturing devices, or any device capable of responding to, handling, transferring or interacting with digital data are also resources. Software, or any other form of instruction, is executed by processors in the system and is also a type of resource. Finally, communication resources are also part of the system such as a digital network's hardware including the network's configuration and topology, is where control of the network is provided by software and/or hardware. Additionally, the network may be based on wired connections or wireless connections. For instance, the network hardware and software may be based on Bluetooth wireless standards.

For example, a processing network of a general consumer might include a PDA and a cell phone, each connected by wireless channels to a single personal computer, which in turn is connected to an email server at a remote location through the Internet. As another example, a processing network might include a personal computer running Microsoft Windows 98 operating system, a lap-top computer running Linux operating system, and another personal computer running Windows NT operating system along with router and firewall software, wherein all three computers are connected using a local Ethernet hub, and the router software routes connections to the Internet.

According to an embodiment of the present invention, the resources for such a processing network are fully selectable and allocable by a system architect. In a specific embodiment, a primary company, Jareva Technologies, Inc.® provides proprietary technology to a system architect for designing a system by allocating resources and specifying how the resources are to be used. The system architect may be an individual, corporate entity, etc. The system is referred to as an "environment"—or more specifically as a "computing environment" and the primary provider of such an environment is referred to as an Environment Service Provider (ESP). A typical system architect is referred to as the "customer." The primary provider obtains revenue for providing the resources and the tools to easily select, allocate, configure and run the environment.

A specific embodiment of the present invention allows fast allocation and configuration of resources such that different environments can be created from the same resources within minutes, or even seconds. This allows "time sharing" of overall resources so that a first environment may be "alive" or operative for a time period defined by the system architect (e.g., daily two-hour slot), followed by second, third and fourth environments being instantly created for the next four hours for three different customers, and so on. After a time period expires, such environments might either manually or automatically de-allocate such resources. Because these "computing environments" may be dynamically configured and re-configured out of the same set of resources, they will also be referred to as "Dynamic Computing Environments".

In particular, environments without any computing devices i.e., environments made only of networks, will also be referred to as "virtual networked environments" or simply as "virtual networks".

A specific embodiment allows customers to create a computing environment from a remotely-accessible user interface such as a web page on the Internet. Thus, the customer can create, modify and operate the environment from anywhere in the world. Since the resources, in turn, can communicate over networks, including the Internet, this approach eliminates the cost of shipping hardware and software. Hardware and software designers, programmers, testers or other personnel using an environment according to the present invention can, similarly, be located anywhere in the world such that labor costs are optimized.

The creation of dynamic computing environments ("DCE") is automatic. For example, a customer can request a web-site simulator using twelve web-page servers on a Microsoft® NT platform, two disk arrays at a specific bandwidth and storage capacity, two caching servers and 200 clients running Netscape Navigator™ under Microsoft Windows® 2000 using Pentium III™ processors at under 800 MHz. Such an environment is created and destroyed, and even re-created automatically, without human intervention each time. Unlike the conventional computing infrastructure, according to an embodiment of the present invention there is no need to physically couple or de-couple, each physical machine or resource to each other upon adding or removing such resources. There is no need to set-up Internet Protocol (IP) addresses or other network settings, or install operating systems and associated application programs on one or more physical machines. All such activities on a DCE can be performed automatically without user intervention.

According to an embodiment of the present invention, the DCE is a virtual computing system including a network comprising a number of distinct types of machines and a network connecting them. For example, a system architect might require a DCE to include a Sun Sparc running a certain version of Solaris O/S coupled to a Linux machine. The present invention enables the separation of the activity of designing a DCE, from the activity of actually creating the DCE. Designing a DCE includes choosing the specific hardware, choosing the operating systems or other software, and choosing the specific interconnections, etc. Creating a DCE includes allocating the resources, installing the operating systems and other software, etc. Furthermore, embodiments of the present invention automate the process of creating the DCE. A DCE for which resources have not been allocated yet will also be referred to as a virtual computing environment. Similarly, a computing device (or a subnet) that is part of a DCE will also be referred to as a virtual computing device (or a virtual subnet), if the required resources for the computing device (or the subnet) have not been allocated yet.

An embodiment of the present invention provides a framework that enables configuring, and provisioning DCEs remotely. Configuring a DCE involves choosing the resources and their interconnections. Embodiments of the present invention support operations for making such design choices through appropriate programmable interfaces. The interfaces can be used interactively through a graphical user interface such as a web page or non-interactively through a program script. Provisioning a DCE involves allocation of physical resources required for a DCE to function. Embodiments of the present invention manages the physical resources needed for provisioning DCEs and supports operations for allocating/de-allocating these resources. In one embodiment of the present invention, the framework for provisioning DCEs is implemented as a distributed system consisting of different software programs running on different computers and networking hardware. In a further embodiment, the present invention permits "virtual" hosting of dynamic computing environments. As used herein, the term "virtual" specifies that neither the requisite devices nor the network need to be physically accessible to users. Further, in accordance with this embodiment, the hosting process may be initiated or terminated by users at will, from any geographic location. Thus the administrative framework allows users to remotely configure and provision DCEs.

A further understanding of embodiments of the present invention will be gained with reference to the diagrams and the descriptions that follow.

In FIG. 1, a USER1 PC, USER2 PC, and a dynamic computing environment ("DCE") 104 is shown. The USER1, USER2, and DCE are interconnected through a digital network 120, such as the Internet.

DCE 104 includes any number, type, and configuration of hardware components and software processes. For example, a user, or a group of users, may be allocated an International Business Machines (IBM) compatible PC (such as PC D) having an Intel processor, running a Microsoft operating system, having random-access memory (RAM), hard disk storage, etc. Software process 102 is also running within the PC of DCE 104. Note that any arbitrary user may be allocated any combination of resources.

USER2 may be local to the DCE but will typically be located in a remote location from the physical DCE and communicates with the allocated resources via a digital network such as Internet 120. Communications handler 122 can be dedicated software to allow USER2 to interact with the allocated resources and with software process 102. Communications handler 122 can also be, e.g., a web browser, operating system, or other means of interfacing and control. In some cases, communications handler 122 is not needed. For example, USER2 can communicate with the DCE via communications hardware and software at the DCE (not shown in FIG. 1) so that USER2 may not even need a PC but can use a "dumb" terminal, or limited device such as a personal digital assistant (PDA), palmtop computer, web-enabled cell phone, etc.

USER1 can be local to the DCE but will typically be located in a remote location from the physical DCE and communicates with the allocated resources via a digital network such as Internet 120. USER1 includes a communications handler 124, which can include the same properties as communications handler 122. USER1 can also include the same properties as described above for USER2. Additionally, USER1 can be local to USER2 or can be located in a remote location from the physical USER2 PC.

Software process 102 can be any type of application program, applet, operating system, plug-in, user-interface controller, or other process. Also, more than one user can use the allocated resources of the DCE at one time.

USER1 and/or USER2 are able to execute, or have other interaction with, software process 102. However, software process 102 is not resident at USER1 or USER2's PC. Instead, software process 102 resides in DCE 104. USER1 can also contain software processes allowing USER1 to allocate resources in the DCE. For example, a user interface as disclosed in "User Interface for Dynamic Computing Environment Using Allocateable Resources" Ser. No. 09/663,252 filed on Sep. 15, 2000 and U.S. Non-Provisional Patent Application entitled "System for Configuration of Dynamic Computing Environments Using a Visual Interface" Ser. No. 09/662,990 filed on Sep. 15, 2000 can be used by USER1 to allocate resources. USER1 can then allocate and configure various resources for USER2. Additionally, USER1 can re-allocate and re-configure the various resources when needs change or different applications need to be run. Also, it should be understood that USER2 can also allocate resources in the DCE. Further, control to allocate and configure resources can be switched between USER1 and USER2. Also, either USER1 or USER2 can have priority in allocating and configuring resources. Thus, the user that has priority can send a command overriding any other user's control to allocate resources.

Once the resources have been allocated, USER1 and/or USER2 can interact with software process 102. For example, USER2 can interact with software process 102 and receive information related to the interaction. USER2 can also modify the information and further interact with software process 102. Additionally, USER1 may wish to monitor or control USER2's interaction with the software process 102. USER1 can then send a command to cause interface and control information to be transferred to USER1's PC. In other words, USER1 may receive the same information or view the same screen as shown on USER2's PC. USER1 can also send a command limiting USER2's control, or access, to software process 102. For example, USER2 may be only given viewing rights and not control rights. In contrast, USER2 can also send a command requesting control or access of the software process 102. In order to avoid conflicts, a priority system can be set up where either USER1 or USER2 will receive control or access over the other user. For example, a command from USER1 would cause USER2 to lose control until USER1 signaled control should be given back to USER2. Thus, control of the software process 102 and control of which user PC can modify the information received is enabled.

Therefore, USER1 and USER2 can gain control over the identical resources. This eliminates inherent problems caused by having different users operating different computing systems while trying to access or share the same resource. Additionally, users other than USER1 and USER2 may be included.

The use of dynamic computing environments enables rapid provisioning of computing infrastructure to meet the computing needs of various phases of software lifecycle. In each phase of the cycle, resources may be automatically allocated in the DCE depending on the various needs of the stage. Users participating in each stage can access the environment through a user interface, such as a web browser, and use the allocated resources throughout each stage. Each user may use the same computer throughout the process and changes to the allocated resources are accomplished seamlessly without affecting the user. Additionally, each stage of the software lifecycle may completed using the same DCE for multiple software models, such as the shrinkwrap, web site, or ASP models.

In one embodiment, some or all of the following phases may be part of a software lifecycle for a software lifecycle, such as the shrinkwrap, web site, or ASP models: development, integration, testing, beta testing, beta deployment, staging, and deployment.

During the software development phase, usage of computing resources goes through short iterations of interactive activity (editing), followed by typically CPU intensive activity (compilation and execution). This phase of the lifecycle and the computing requirements are similar across the different models of the software lifecycle. Typical computing requirements for this phase include multiple copies of different configurations of hardware/software combinations. For example, all developers of a software organization may use Linux operating system on a x86 architecture as the development platform. Dynamic computing environments optimize the resource usage based on the individual activities. For instance, a developer may use one system for editing and use one or more other systems for compilation and execution even though none of these systems are reserved for or locally available to that developer.

Figure 2:
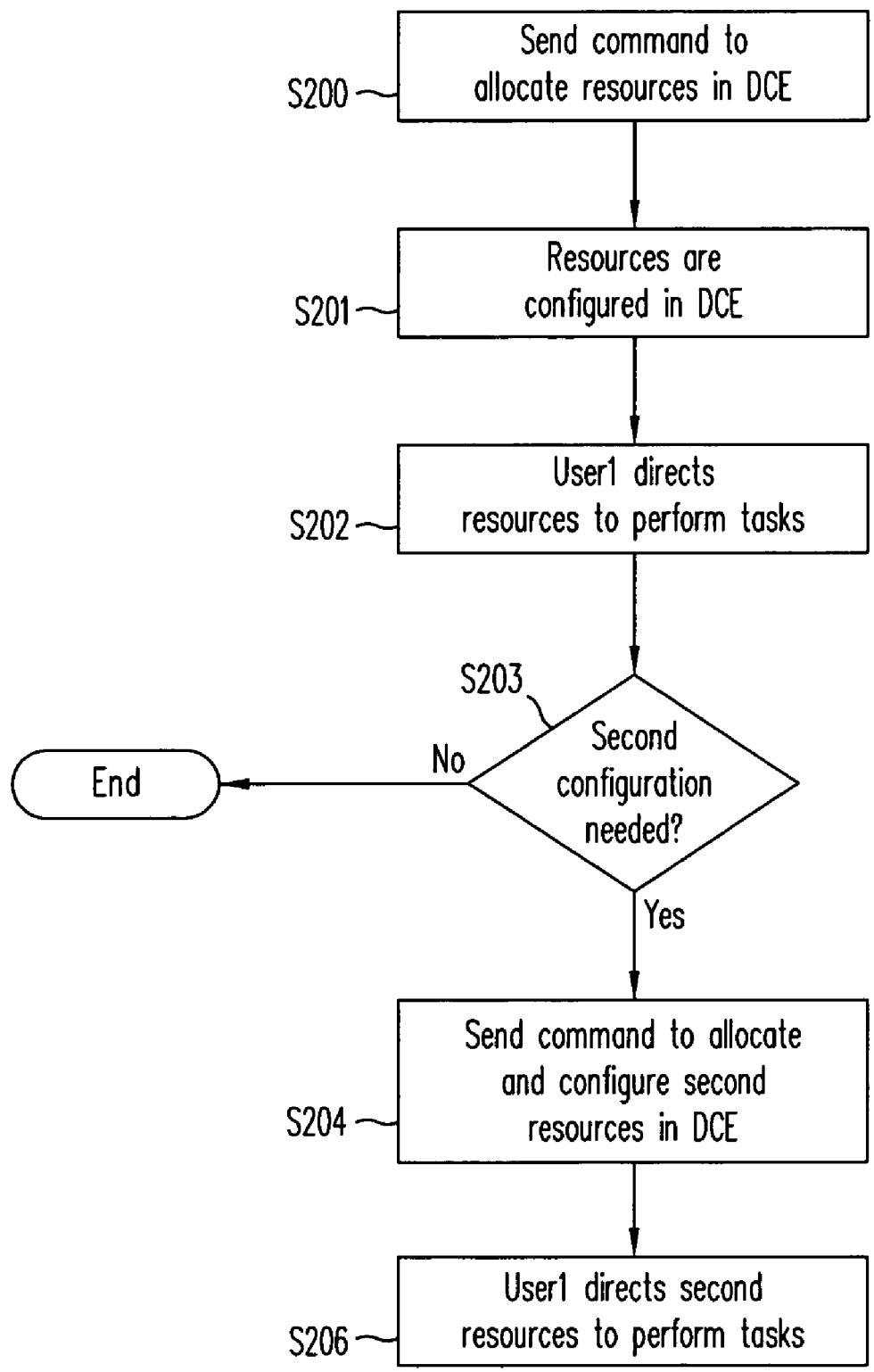
FIG. 2 illustrates a method for the software development stage using the DCE according to one embodiment.

FIG. 2 illustrates a method for using DCE 104 for the software development stage according to one embodiment. A developer, such as USER1, may use DCE 104 to complete all tasks during the development phase. Additionally, all of the development tasks may be accomplished simultaneously. For example, in step S200, a command is sent to automatically allocate resources, such as PC A, with a first hardware/software configuration for a first task, such as editing. The computing resources are then configured in DCE 104 (S201). USER1 may then direct PC A to perform tasks, such as edit or develop code, from the user interface located on USER1's PC (S202).

If a second configuration is needed (S203), a command may be sent to automatically allocate and configure a second PC, such as PC B, with a second configuration that would be used for a second task, such as for the compilation and execution of developed code (S204). USER1 may then direct PC B from the user interface to perform tasks, such as compiling or executing code.

Thus, using the configured PC's, USER1 may edit or develop code while compiling or executing code. These tasks may be completed by USER1 without imposing any computing requirements on USER1's PC. Unlike prior art, where the system resources of the computers USER1's PC are being used, all computing is done on the allocated resources in DCE 104 while USER1 interacts with DCE 104 through a user interface. Additionally, USER1 is not restricted by space requirements needed for multiple systems. Further, USER1's PC is not loaded down by the tasks being completed by PCs A or B. Certain tasks, such as compilation, may use up almost all of a computers processing power and thus, USER1 may not be able to further develop on a computer that is compiling code. However, using DCE 104, USER1's computer is still available for development purposes and only the remote computers PC's A and B processing power are being used.

During the integration phase, different parts of the software are assembled together into one package. Computing requirements for this phase include multiple copies of different configurations of hardware/software combinations. Software is typically developed in independent modules by different developers. But the developers need to mutually agree upon common interfaces between these modules so that these modules may function collectively and interact with each other when they are connected. Thus, the integration phase starts out with a collection of modules and results in a fully functioning software.

For instance, a three-tier software system typically includes an application server, a web server, and a client. Prior to integration, the application server, the web server and the web client have been developed independently based on interfaces and protocols mutually agreed upon among developers. In this instance, integration may involve ensuring: that a client can send a request for a specific high level task to the web server; that the web server will translate this request to one or more actions to be performed on the application server and send a request for each of these actions; the application server will perform these actions, and may access and/or update a database as part of these actions, and will send the results to the web server where the web server will compose these responses and report the necessary information to the client; and the client will then present the information in a suitable form to the user.

Each of the three components may be configured from a set of options. Using the same terminal as used in the development stage, USER1 sends a command to allocate resources in DCE 104 with the required hardware/software combinations for the integration phase. For example, in a specific embodiment, USER1 may configure: an application server in DCE 104 with an Informix database running either on a Solaris™ server or on a Linux server; a web server in DCE 104 with either be a Linux system hosting an Apache™ web server or a Microsoft Windows N™ system hosting an IIS™ web server; and a client in DCE 104 with an Active-X™ component either in a Microsoft Windows 95™ system or in a Microsoft Windows 98™ system. Thus, all integration may be controlled by USER1 with different configurations being allocated as needs change.

Figure 3:
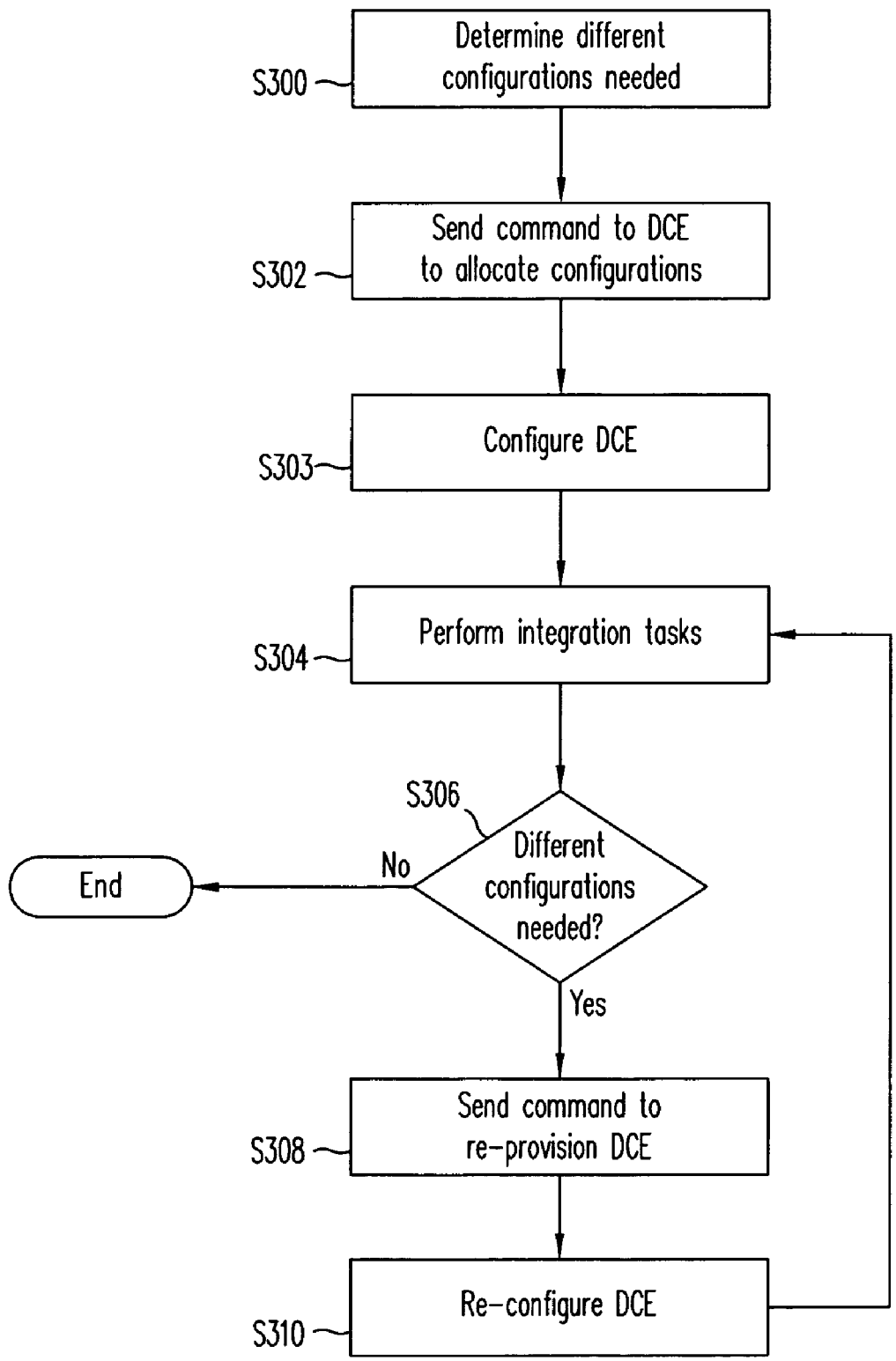
FIG. 3 illustrates a method of using DCE for the integration phase according to one embodiment.

FIG. 3 illustrates a method of integration using DCE 104 according to one embodiment. In step S300, USER1 determines the different configurations of hardware/software that are needed for the stage. A command is then sent to automatically allocate resources in DCE 104 to realize the desired configurations (S302). DCE 104 is then configured (S303). Integration of the software is then performed using DCE 104 through USER1's PC (S304). During integration, USER1 may decide that different configurations are needed (S306). If so, a command is sent to re-provision DCE 104 to represent the new configurations (S308). DCE 104 is then re-configured (S310), and the method re-iterates to step S304 where integration tasks are again performed. The method ends if different configurations at not needed.

Using dynamic computing environments for the integration phase enables uniform access to all these systems through USER1's web browser. Most of these requirements may be "shorter-term" needs when compared to the development phase. Because dynamic computing environments enable rapid provisioning or re-provisioning of infrastructure upon a command from a user, DCE's are suited for meeting the needs of the integration phase.

Figure 4:
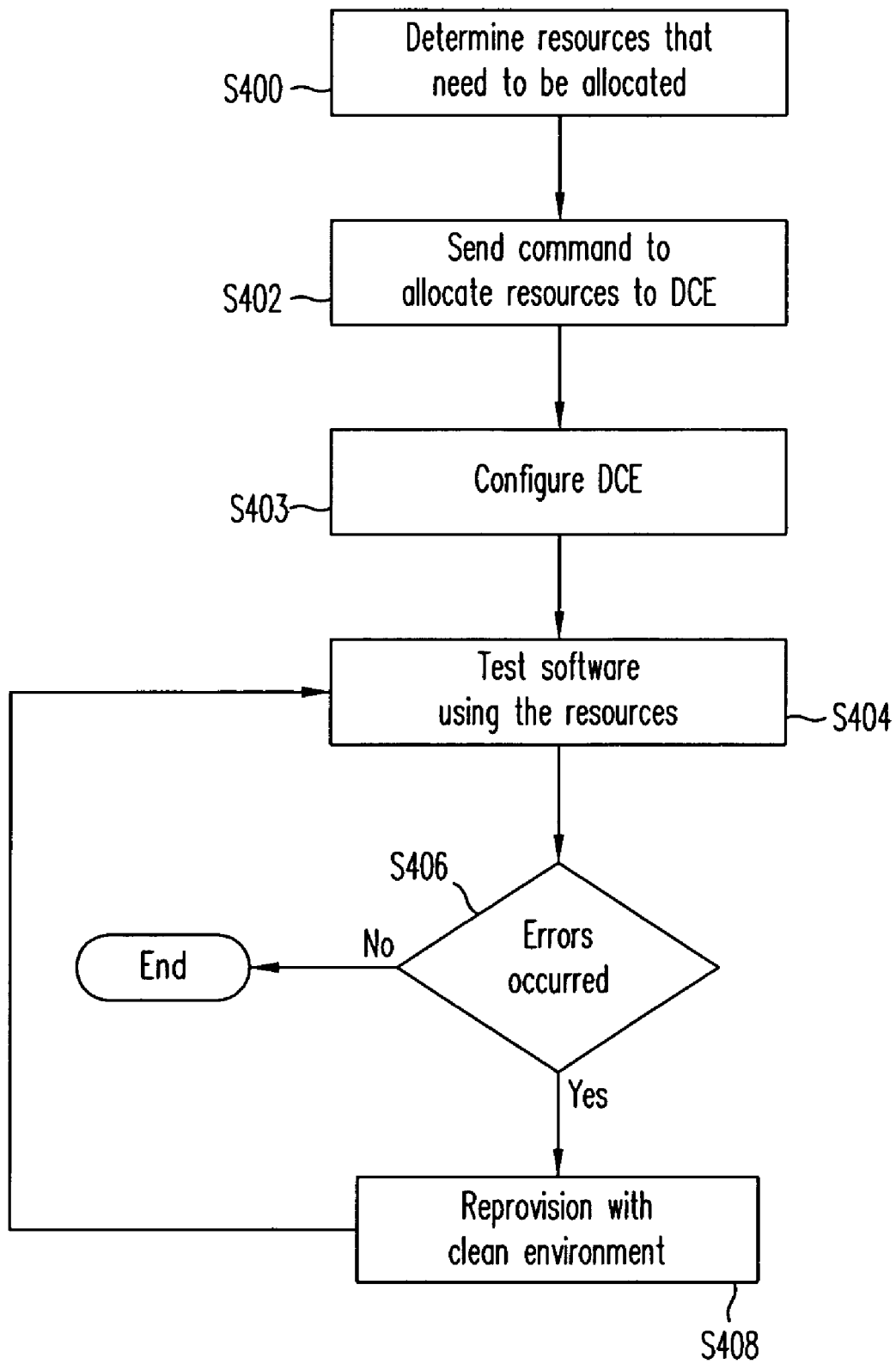
FIG. 4 illustrates a method of using the DCE for the testing phase according to one embodiment.

Dynamic computing environments also enable allocation of resources during the testing phase of the software lifecycle, where requirements may include clean configurations and crash-and-burn environments. FIG. 4 illustrates a method of using DCE 104 for the testing phase according to one embodiment. In step S400, the resources that need to be allocated are determined. Typically, testing is done on a wide range of computing devices, which run different operating systems and software. Each of these 'configurations' has to be defined in terms of the type of the component resource (hardware or software), the vendor, the version, etc. For example, in a specific embodiment, in the integration scenario described above, testing the web server component may involve the configurations (a) and (b) listed below:

(a) all combinations of the following—one of RedHat Linux™ version 5.2, RedHat Linux™ version 6.0, or TurboLinux™ version 6.0 hosting one of Apache™ web server with the cgi-bin module or Apache™ web server with the Java™ servlets module; and (b) IIS™ server running on one of Windows NT™ 4.0 with service pack 3, or Windows NT™ 4.0 with service pack 5.

In addition, special testing software and test-suites may be included in the configuration of the systems used in this phase.

In step S402, a command is sent from USER1 to allocate the determined resources in DCE 104. In step S403, DCE 104 is configured. In step S404, the software is tested using the configured resources. During a sequence of tests, the environment may get corrupted or the system may crash. Consequently, the testers have to start with a fresh copy of the configuration for each cycle of testing. Thus, if errors occurred (S406), the same configuration that crashed is automatically re-provisioned with a clean environment (S408). The method reiterates to step S404 software is tested again. If no errors occur, the method ends.

Accordingly, dynamic computing environments enable fast and easy configuration of computing resources required for testing. Also, DCEs enable replication, saving, and restoring of these configurations, which reduces the tedium of repetition involved.

Additionally, testing usually involves multiple aspects of software, such as compatibility, functionality, usability, and scalability. Testing schemes and systems needed may also depend on the model of software. Dynamic computing environments provide a comprehensive platform for all testing needs of an organization. Also, DCEs free an organization from owning and maintaining the systems at all times when they are used only for testing.

The beta testing phase may involve testing done by personnel outside the development organization before a software system is deployed. Similarly, beta deployment may refer to deployment for the purpose of evaluation of software by personnel possibly outside the development organization. In the shrink-wrap model, this involves downloads or installations by individuals who are participating in the process. Although downloads and installations may have to be tested as part of the process, these may distract beta testers or beta customers from other aspects of testing and usage. In addition, even if beta testers are willing to go through downloads and installation, they may not be willing to risk corrupting their storage or configuration of their own systems to test software developed by others. Therefore, dynamic computing environments may then be used as a channel for beta testing and deployment.

Figure 5:
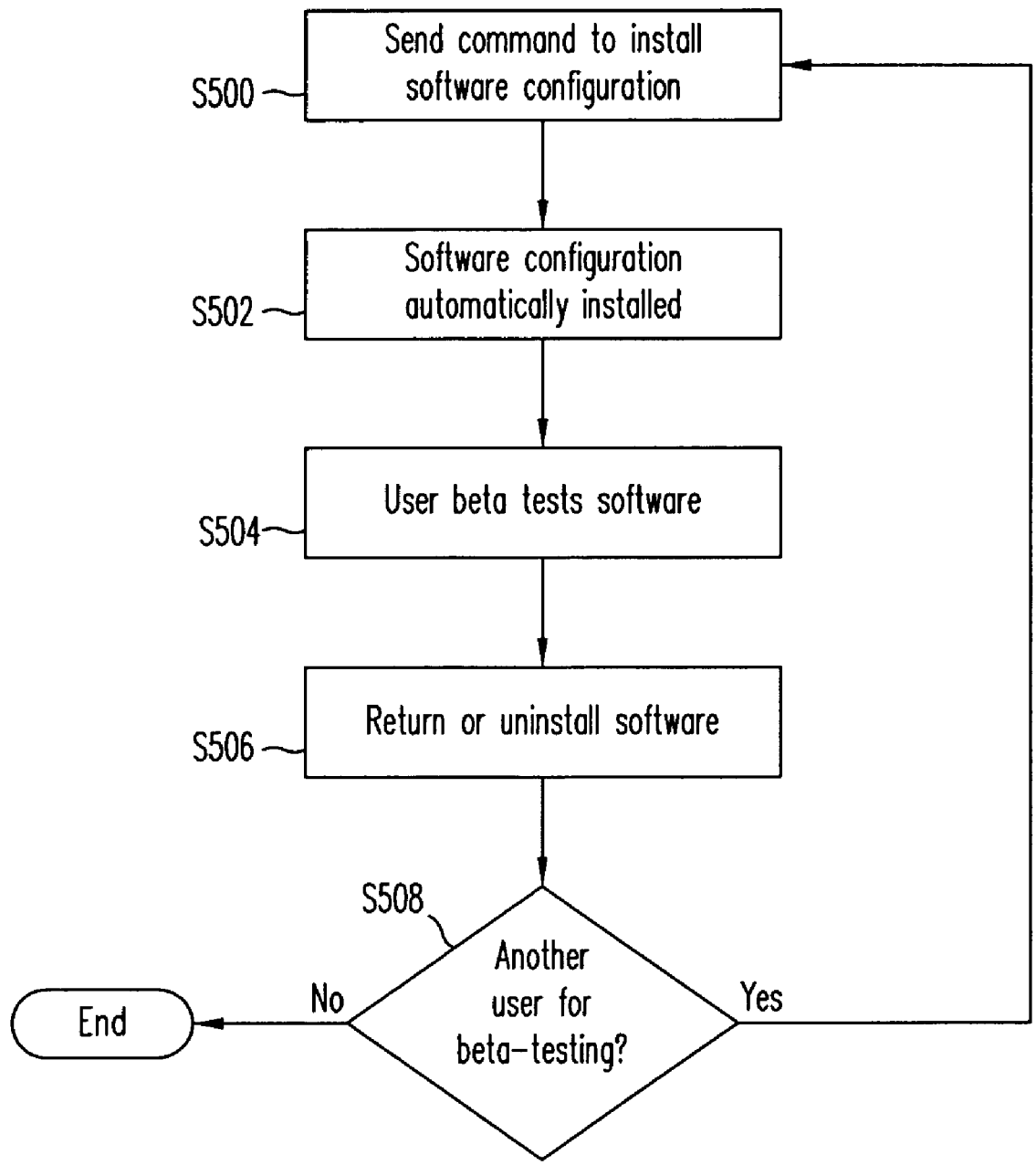
FIG. 5 illustrates a method of using the DCE for the beta testing phase according to one embodiment.

FIG. 5 illustrates a method of beta testing and deployment according to one embodiment. In step S500, a first beta tester, such as USER1, sends a command to automatically install a software/hardware configuration to be tested on DCE 104. The software is then automatically installed in DCE 104 (S502). The first beta tester then tests the software from the beta testers terminal (S504). Thus, the beta tester can beta test the software without installing any software on their own computer. Once the beta tester is through testing, the software may be returned to storage or uninstalled from the allocated resources (S506). Thus, the allocated resources can be used for other purposes. Typically, proper beta testing involves testing the software with many different users. Therefore, if another user, such as USER2 or another individual using the USER1 terminal, desires to beta test the software (S508), and reiterates to step S500 where a command is sent to DCE 104 to automatically install the same or another software/hardware configuration on DCE 104. The method ends when there are no other beta testers.

Accordingly, a software development organization may use DCE 104 to provide systems for individual testers or customers on demand. This reduces the ownership and maintenance cost of computing resources. Additionally, dynamic computing environments remove the location-dependency aspect of the shrink-wrap software model, elevating the model to be on par with the ASP model or web site model in terms of location-agnostic access.

Figure 6:
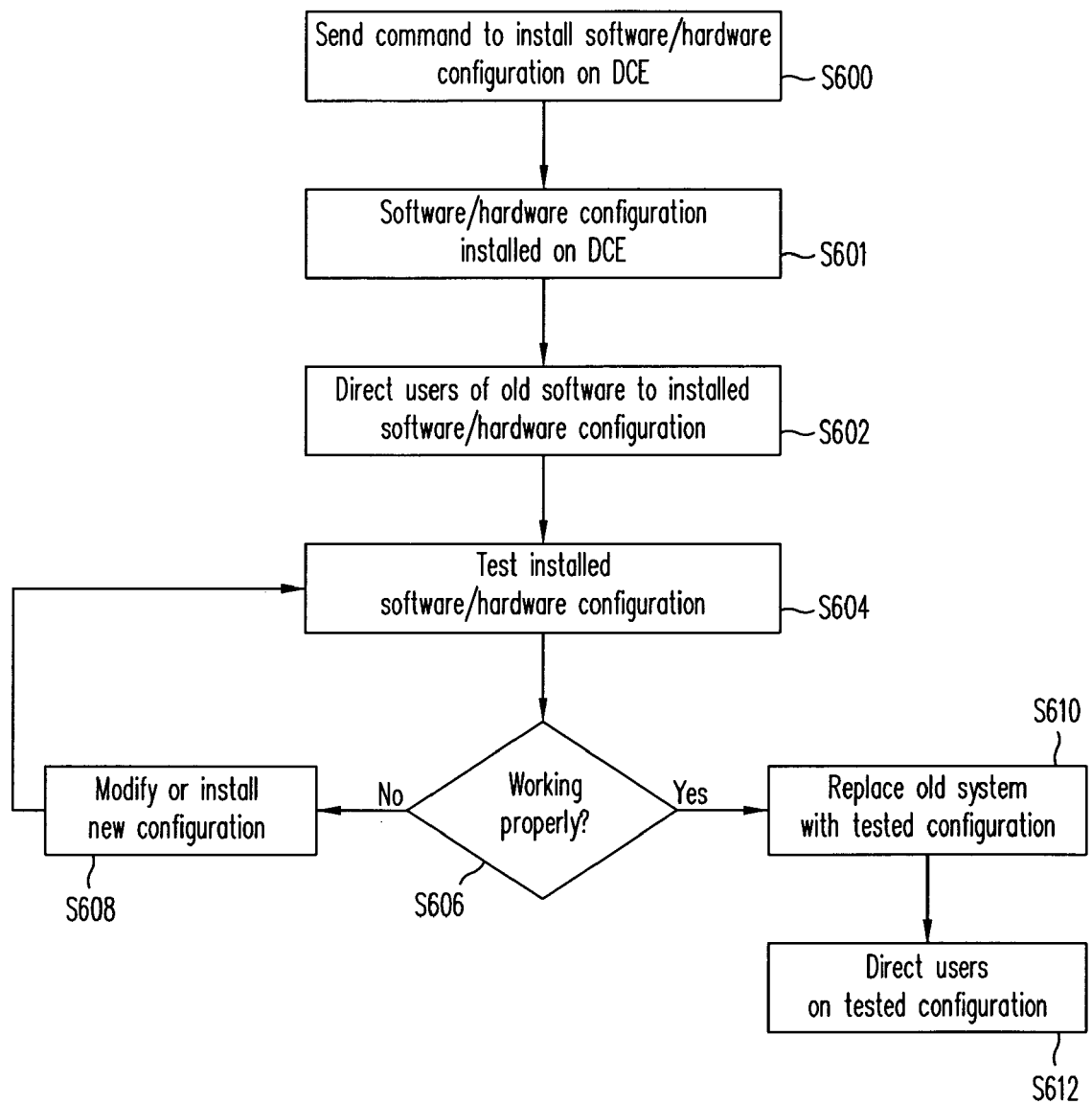
FIG. 6 illustrates a method of using the DCE for the staging phase according to one embodiment.

The phase of staging usually applies to the web site model and the ASP model; however, the phase is not limited to the web site and ASP models. The phase usually serves different purposes, such as scalability testing, transiting from an existing version to a new version, and integrating software with the rest of the provider environment. FIG. 6 illustrates a method of using DCE 104 for the staging phase according to one embodiment. In step S600, USER1 sends a command to automatically install the software/hardware configuration on DCE 104. In step S601, the software/hardware configuration is installed and configured on DCE 104. Then, a portion of users of the old software can be directed to the new software (S602). The new software is then tested, monitored, etc. (S604). If the new software is not working properly (S606), the software may be modified or the process may go automatically install entirely new software on the DCE (S608). The method then reiterates to step S604 for re-testing.

If the new software is working properly, the old system may be replaced with the now tested new system (S610). In order to seamlessly transfer the new software to the new software site, all users can be directed to the functioning new software while the old software is being replaced (S612). Once the new software is installed, the users can be re-directed back to the old system, which has the new software installed on it (S614).

An example of the above process may be when a web site replaces its search engine software with a new version and a new URL may be required to access the web site. Because links to the search engine may be scattered all across the web, the replacement cannot be instantaneous. The web site may stage the new software and then seamlessly redirect a part of its users to the new software until the old software is completely replaced. This will also enable the web site to integrate the search software with the rest of the web site. Also, staging by itself may be a graded process so that new software eventually replaces existing software. During the process of staging, computing environments have to be switched effectively from using one set of software to another. In addition, the web site may want to enforce some level of isolation between these sets for maintenance and tracking purposes. The isolation may result in additional infrastructure and manpower for maintenance, both of which will be redundant after the staging phase.

Dynamic computing environments eliminate the redundancy by catering to short-term needs effectively. In addition, if a large organization uses specialized software and system settings for staging, then dynamic computing environments help save the settings as special configurations that may be restored on demand. Thus, dynamic computing environments help an organization to perform staging more often and more effectively because of the reduced cost and effort.

The deployment phase may vary between the shrink-wrap, ASP, and web site models. For example, in the shrink-wrap model, the deployment phase is not usually owned by the organization developing and selling the software. However, in the web site and the ASP models, the deployment phase is owned by the organization responsible for development, sales, or both. For example, an organization hosting or deploying the web service may choose to deploy a plurality of copies of the same configuration (hardware, software, and network access). Thus, the deployment requires several copies of one type of web service configuration (e.g., x86 computers running Linux operating system and the web service software). In prior art, the multiple copies have to be installed manually because there is no easy way to replicate a configuration. This may be acceptable for initial deployment. However, the deployment phase also requires constant updates (for bug fixes or performance updates or other improvements to the software). All these updates also have to be consistently replicated on all the copies. Prior art systems use manual efforts for replication, which require man power and also results in delays and down-times for the service.

Figure 7:
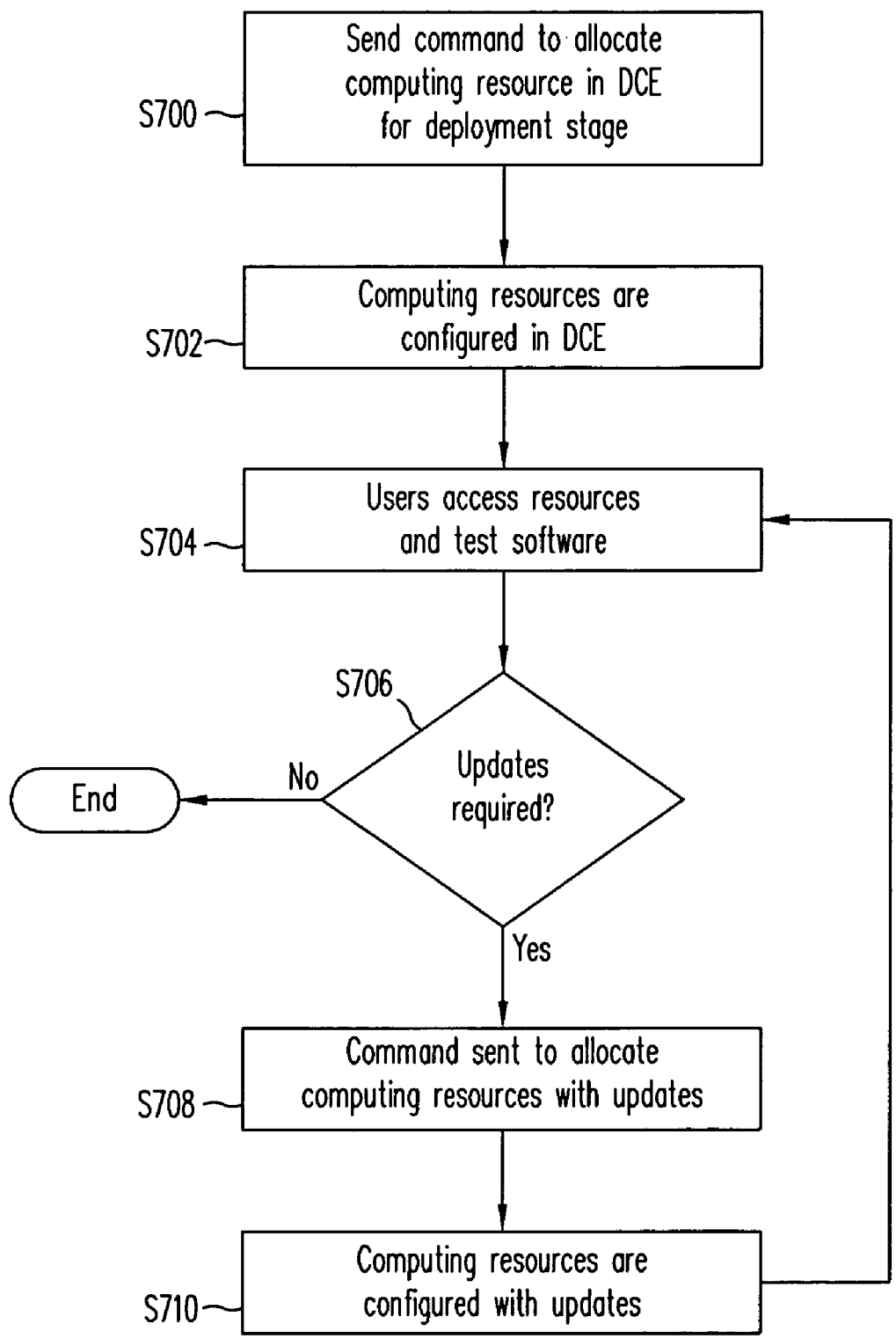
FIG. 7 illustrates a method of using the DCE for the deployment stage according to one embodiment.

FIG. 7 illustrates a method of using a DCE for the deployment stage according to one embodiment. In step S700, a command is sent from USER1 to allocate computing resources for the deployment stage in DCE 104. For example, multiple copies of one configuration may be allocated for a software program. The multiple copies may be allocated on multiple PCs, such as PC A, PC B, etc. In step S702, the computing resources are configured in DCE 104. In step S704, users may access DCE 104 remotely and test the software and computing resources.

If updates are required after testing (S706), a command is sent to allocate computing resources with updated or fixed software configurations (S708). In step S710, the computing resources are configured with the updated software configurations. The method then reiterates to step S704 where the software and computing resources are tested again. If updates are not required, the method ends.

Thus, a system enabling automatic configuration and re-configuration of computing environments increases the utilization of computing infrastructure and reduces the transition time between different phases of the software lifecycle is provided by embodiments of the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalence.

What is claimed is:

1. A method of using a dynamic computing environment ("DCE") for a plurality of phases in a software lifecycle, the method comprising:
    configuring the dynamic computing environment for a first phase in the plurality of phases, wherein said configuring comprises
        allocating a first subnet,
        allocating a first computing device coupled to the first subnet,
        allocating a first storage device coupled to the first computing device, and
        storing a first set of instructions on the first storage device;
    using the configured dynamic computing environment in the first phase;
    deallocating one or more of the first subnet, the first computing device, and the first storage device;
    configuring the dynamic computing environment for a second phase in the plurality of phases, wherein said configuring comprises
        allocating a second subnet subsequent to said deallocating the first subnet,
        allocating a second computing device coupled to the second subnet subsequent to said deallocating the first computing device,
        allocating a second storage device coupled to the second computing device subsequent to said deallocating the first storage device, and
        storing a second set of instructions on the second storage device subsequent to said deallocating the first storage device; and
    using the configured dynamic computing environment in the second phase.

2. The method of claim 1, wherein the plurality of phases comprise a development phase.

3. The method of claim 2, wherein using the configured dynamic computing environment comprises:
   using the configured DCE for a first task; and
   using the configured DCE simultaneously with the first task for a second task.

4. The method of claim 1, wherein the plurality of phases comprise an integration phase.

5. The method of claim 4, wherein using the configured dynamic computing environment for an integration phase comprises:
   executing the first set of instructions on the first computing device, wherein
      the first set of instructions causes a first set of information to be transmitted to a third computing device coupled to the first subnet;
   in response to the first set of information, executing a third set of instructions on the third computing device; and
   monitoring said executing the first and third set of instructions and a result of said executing the third set of instructions.

6. The method of claim 1, wherein the plurality of phases comprise a testing phase.

7. The method of claim 6 further comprising:
   if said using the configured DCE in the first phase results in an error, re-provisioning a clean environment in the configured DCE during the testing phase.

8. The method of claim 1 wherein the plurality of phases comprises:
   a beta testing phase, wherein
      a first user performs said using the configured DCE in the first phase, and
      a second user performs said using the configured DCE in the second phase.

9. The method of claim 8 wherein during the beta testing phase,
   said configuring the DCE comprises the first user installing the first set of instructions on the DCE, and
   said using the configured DCE comprises the first user beta testing the first set of instructions using the DCE.

10. The method of claim 1, wherein the plurality of phases comprise a staging phase.

11. The method of claim 10, wherein
   configuring the dynamic computing environment comprises installing a new version of the first set of instructions, and
   using the configured dynamic computing environment comprises enabling access for at least one user to the new version of the first set of instructions.

12. The method of claim 1, wherein the plurality of phases comprise a deployment phase.

13. The method of claim 12, wherein using the configured dynamic computing environment comprises:
   testing the first set of instructions; and
   updating the first set of instructions if updates are required.

14. The method of claim 1, wherein the software lifecycle comprises a shrink-wrap lifecycle.

15. The method of claim 1, wherein the software lifecycle comprises a web site lifecycle.

16. The method of claim 1, wherein the software lifecycle comprises an ASP lifecycle.

17. A method comprising:
   (a) sending a command to a DCE to allocate resources for a phase in a software lifecycle, wherein
      the resources include a subnet, a computing device, a storage device, and software;
   (b) configuring the DCE with the resources for the phase, wherein said configuring comprises
      coupling the subnet and the computing device,
      coupling the computing device and the storage device, and
      installing the software on the storage device;
   (c) performing the phase using the configured DCE;
   (d) de-allocating the resources upon completion of performance of the phase; and
   (e) repeating steps (a)–(d) for each of a plurality of phases in the software lifecycle subsequent to said de-allocating the resources.

18. The method of claim 17, wherein
the plurality of phases comprise at least one of a development stage, integration stage, testing stage, beta testing stage, beta deployment stage, and deployment stage.

19. The method of claim 17, wherein
the software lifecycle comprises at least one of a web site lifecycle, an application service provider lifecycle, and a shrink-wrap lifecycle.

20. An apparatus comprising:
a dynamic computing environment ("DCE"), wherein
   the DCE comprises a virtual subnet and a plurality of virtual computing devices;
instructions for configuring the dynamic computing environment for a first phase in the plurality of phases, the instructions comprising
   instructions for allocating a first network resource to the virtual subnet,
   instructions for allocating a first computing device to the plurality of virtual computing devices and coupling the first computing device to the first network resource,
   instructions for allocating a first storage device to the plurality of virtual computing devices and coupling the first storage device to the first computing device, and
   instructions for storing a first software on the first storage device;
instructions for using the configured dynamic computing environment in the first phase;
instructions for de-allocating one or more of the first network resource, the first computing device, and the first storage device;
instructions for configuring the dynamic computing environment for a second phase in the plurality of phases, the instructions comprising
   instructions for allocating a second network resource to the virtual subnet subsequent to said de-allocating the first network resource,
   instructions for allocating a second computing device to the plurality of virtual computing devices and coupling the second computing device to the second network resource subsequent to said de-allocating the first computing device,
   instructions for allocating a second storage device to the plurality of virtual computing devices and coupling the second storage device to the second computing device subsequent to said de-allocating the first storage device, and
   instructions for storing a second software on the second storage device subsequent to said de-allocating the first storage device; and instructions for using the configured dynamic computing environment in the second phase.

21. An apparatus comprising:

a dynamic computing environment ("DCE"), wherein the DCE comprises a virtual subnet and a plurality of virtual computing devices;

(a) instructions for sending a command to a DCE to allocate resources for a phase in a software lifecycle, wherein the resources include a subnet, a computing device, a storage device, and software;

(b) instructions for configuring the DCE with the resources for the phase, wherein said configuring comprises coupling the subnet and the computing device, coupling the computing device and the storage device, and installing the software on the storage device;

(c) instructions for performing the phase using the configured DCE;

(d) instructions for de-allocating the resources upon completion of performance of the phase; and (e) instructions for repeating instructions (a)–(d) for each of a plurality of phases in the software lifecycle subsequent to de-allocating the resources.

* * * * *

UNITED STATES PATENT AND TRADEMARK OFFICE
CERTIFICATE OF CORRECTION

| | | |
|---|---|---|
| PATENT NO. | : 7,213,231 B1 | Page 1 of 1 |
| APPLICATION NO. | : 10/044290 | |
| DATED | : May 1, 2007 | |
| INVENTOR(S) | : Bandhole et al. | |

It is certified that error appears in the above-identified patent and that said Letters Patent is hereby corrected as shown below:

Title Page, Item (73) after "Assignee", please delete "Cisco Technology, Inc., San Jose, CA" and insert:

--VERITAS Operating Corporation, Mountain View, CA--

Signed and Sealed this

Twenty-eighth Day of August, 2007

JON W. DUDAS
*Director of the United States Patent and Trademark Office*